(12) United States Patent
Hayakawa

(10) Patent No.: US 11,525,693 B2
(45) Date of Patent: Dec. 13, 2022

(54) ROUTE GUIDANCE APPARATUS, ROUTE GUIDANCE METHOD, AND STORAGE MEDIUM

(71) Applicant: HONDA MOTOR CO., LTD., Tokyo (JP)

(72) Inventor: Sho Hayakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 16/988,109

(22) Filed: Aug. 7, 2020

(65) Prior Publication Data
US 2020/0370906 A1 Nov. 26, 2020

Related U.S. Application Data (63) Continuation of application No. PCT/JP2018/044476, filed on Dec. 4, 2018.

(30) Foreign Application Priority Data

Feb. 15, 2018 (JP) .............................. JP2018-025338

(51) Int. Cl.
G01C 21/34 (2006.01)
(52) U.S. Cl.
CPC ....... G01C 21/3469 (2013.01); G01C 21/343 (2013.01); G01C 21/3476 (2013.01)
(58) Field of Classification Search
CPC .............. G01C 21/3476; G01C 21/343; G01C 21/3484
See application file for complete search history.

(56) References Cited

U.S. PATENT DOCUMENTS

2008/0120021 A1 5/2008 Kaneda et al.
2008/0165032 A1* 7/2008 Lee .................... G01C 21/3484
340/988

(Continued)

FOREIGN PATENT DOCUMENTS

EP 2450666 A1 9/2012
JP 2010210395 A 9/2010
(Continued)

OTHER PUBLICATIONS

Indian Office Action for Indian Patent No. 202047034808 dated Jul. 26, 2021.
(Continued)

*Primary Examiner* — Khoi H Tran
*Assistant Examiner* — Tristan J Greiner
(74) *Attorney, Agent, or Firm* — Thomas | Horstemeyer, LLP (57) ABSTRACT

The present invention provides a route guidance apparatus for guiding a go-around route of a plurality of transit points, the apparatus comprising: an acquisition unit configured to acquire request information of a user and event information for each of candidates of the plurality of transit points; a selection unit configured to select possible round transit points among the candidates of the plurality of transit points in accordance with a matching degree between the request information and the event information; and a decision unit configured to decide a go-around route of the transit points selected by the selection unit.

14 Claims, 8 Drawing Sheets

(56) References Cited

U.S. PATENT DOCUMENTS

| | | | | |
|---|---|---|---|---|
| 2012/0022777 A1* | 1/2012 | James | ................... | G01C 21/343 |
| | | | | 701/438 |
| 2013/0060462 A1* | 3/2013 | Hansen | .............. | G01C 21/3476 |
| | | | | 701/428 |
| 2014/0129139 A1* | 5/2014 | Ellison | .................... | B60L 53/67 |
| | | | | 701/533 |
| 2014/0142842 A1* | 5/2014 | Knobel | .............. | G01C 21/3682 |
| | | | | 701/410 |
| 2015/0051829 A1* | 2/2015 | Gearhart | ................ | G01C 21/20 |
| | | | | 701/527 |

FOREIGN PATENT DOCUMENTS

| | | | |
|---|---|---|---|
| JP | 2011-227827 A | | 11/2011 |
| JP | 2011227827 A | * | 11/2011 |
| JP | 2015-215295 A | | 12/2015 |
| JP | 2017194317 A | | 10/2017 |
| WO | 2013/137077 A1 | | 9/2013 |
| WO | 2019159498 A1 | | 8/2019 |

OTHER PUBLICATIONS

International Search Report for PCT/JP2018/044476 dated Feb. 26, 2019.
IPRP for PCT/JP2018/044476 dated Mar. 18, 2020.
Kuriyana et al., "Proposal of Congestion Alleviation Scheduling Technique for Car Drivers Based on Prediction of Future Congestion on Roads and Spots", Information Processing Society of Japan Technical Reports, Mar. 16, 2007, pp. 63-70, vol. 2007, No. 28, Japan Academic Association for Copyright Clearance, Inc., Tokyo, Japan.

* cited by examiner

| EVENT TYPE | START TIME | END TIME |
|---|---|---|
| ZAZEN MEETING | 10:00 | 12:00 |
|  | 15:00 | 17:00 |
| SUNSET PHOTO | 16:00 | 17:30 |

ROUTE GUIDANCE APPARATUS, ROUTE GUIDANCE METHOD, AND STORAGE MEDIUM

CROSS-REFERENCE TO RELATED APPLICATION(S)

This application is a continuation of International Patent Application No. PCT/JP2018/044476 filed on Dec. 4, 2018, Which claims priority to and the benefit of Japanese Patent Application No. 2018-025338 filed on Feb. 15, 2018, the entire disclosures of which are incorporated herein by reference.

BACKGROUND OF THE INVENTION

Field of the Invention

The present invention relates to a route guidance apparatus, a route guidance method, and a storage medium which provide guidance for a go-around route of a plurality of transit points.

Background Art

In a conventional navigation system, a route for reaching one destination set by a user is decided in consideration of a distance, a fee, a road width, traffic jam, and the like. PTL 1 proposes an apparatus for notifying the presence of a tourist spot when the tourist spot midway along a route to a destination set by a user is searched for.

For example, in an area in which a plurality of facilities such as tourist spots are scattered, a user requests to efficiency go around to visit the plurality of facilities so that the user can join an event of each tourist spot and go around to visit the tourist spot in a non-congested time. However, in the apparatus described in PTL 1, the presence of the tourist spot is notified, but it is difficult satisfy such a user request.

The present invention has as its object to provide guidance for a route which allows the user to efficiently go around to visit a plurality of transit points.

CITATION LIST

Patent Literature

PTL 1: Japanese Patent Laid-Open No. 2017-194317

SUMMARY OF THE INVENTION

According to the present invention, there is provided a route guidance apparatus for guiding a go-around route of a plurality of transit points, the apparatus comprising: an acquisition unit configured to acquire request information of a user and event information for each of candidates of the plurality of transit points; a selection unit configured to select possible round transit points among the candidates of the plurality of transit points in accordance with a matching degree between the request information and the event information; and a decision unit configured to decide a go-around route of the transit points selected by the selection unit, wherein the request information includes a plurality of requests each having priority set by the user, wherein the selection unit calculates, for each of the candidates of the plurality of transit points, the matching degree such that the matching degree is higher as priority of a request which matches the event information among the plurality of requests is higher, and preferentially selects, as the possible round transit points, transit points whose the calculated matching degree is higher, and wherein in a case where the transit points selected by the selection unit include a specific transit point with a charging station, the decision unit decides the go-around route based on a possible traveling distance estimated by assuming that a battery is charged during a stay time at the specific transit point.

Further features of the present invention will become apparent from the following description of exemplary embodiments with reference to the attached drawings.

DESCRIPTION OF EMBODIMENTS

The embodiment of the present invention will now be described with reference to the accompanying drawings. The present invention is not limited to the following embodiments, and includes changes and modifications of arrangements within the scope of the present invention. In addition, not all the combinations of features described in the embodiments are necessarily essential to the present invention.

Figure 1:
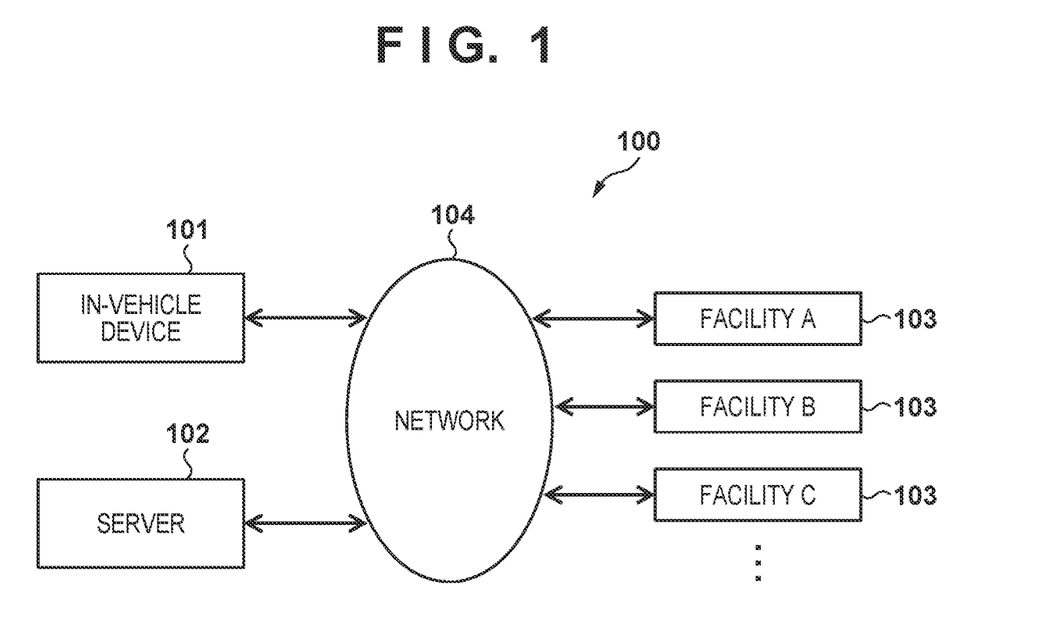
FIG. 1 is a block diagram showing an overall arrangement of a route guidance system.

FIG. 1 is a block diagram showing the overall arrangement of a route guidance system 100 according to an embodiment of the present invention. As shown in FIG. 1, the route guidance system 100 according to this embodiment includes an in-vehicle device 101, a server 102, and a plurality of facilities 103. The in-vehicle device 101, the server 102, and each facility 103 (more specifically, a portable terminal or computer arranged in each facility 103) are communicably arranged via a network 104 and can exchange information (data).

The in-vehicle device 101 is mounted in a vehicle on which a user rides. In this embodiment, as a vehicle on which the in-vehicle device 101 is mounted, a motor-driven straddle type vehicle (for example, a two-wheeled vehicle) will be exemplified. The server 102 can become a computer capable of executing the present invention according to the program. In addition, the plurality of facilities 103 include, for example, tourist spots such as temples and shrines, amusement facilities, restaurants, and charging stations for charging the electric vehicles and can become candidates of a plurality of transit points selected to decide a go-around route to be described later. In an example shown in FIG. 1, a facility A, a facility B, and a facility C are illustrated as the facilities 103. The number of facilities is not limited to three, but can be four or more.

Figure 2A:
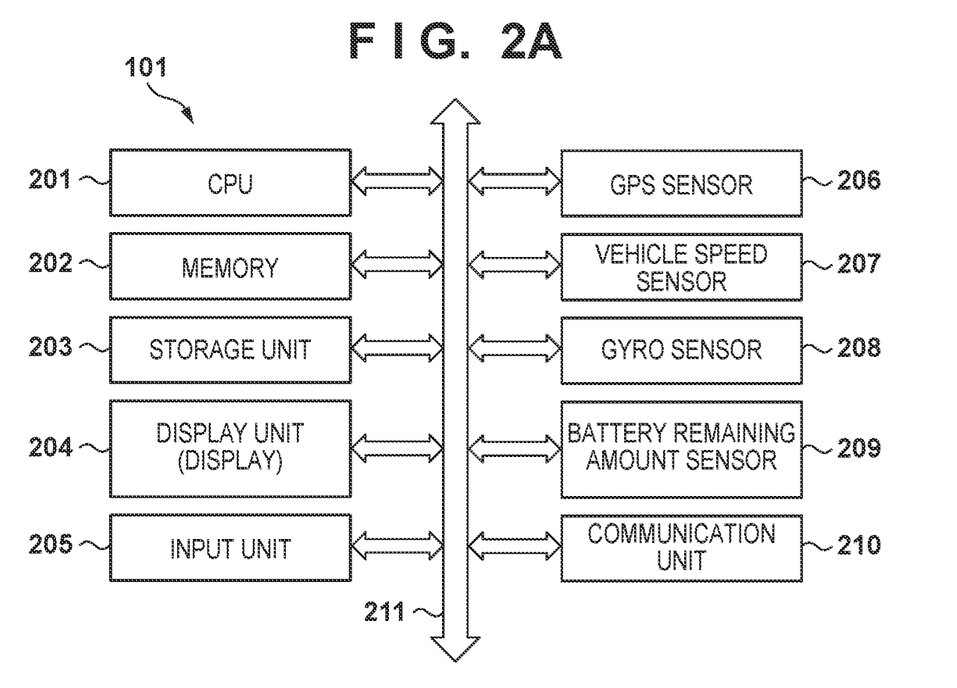
FIG. 2A is a block diagram showing the arrangement of an in-vehicle device.

FIG. 2A is a block diagram showing the arrangement of the in-vehicle device 101. The in-vehicle device 101 is mounted in a vehicle on which the user rides. The respective blocks shown in FIG. 2A are communicably connected via a system bus 211. A CPU 201 comprehensively controls the in-vehicle device 101 by causing the CPU 201 to read out a program stored in a storage unit 203 to a memory 202 and execute the program. The storage unit 203 can store, for example, information input by the user via an input unit 205 in addition to the basic programs and data for operating the in-vehicle device 101. A communication unit 210 serves as an interface capable of performing communication with the network 104 and can exchange information with the server 102 via the network 104.

A display unit 204 gives alarms information to the user by image display. The input unit 205 accepts information input from the user. In this embodiment, a display such as a touch panel LCD (Liquid Crystal Display) is used. The touch panel LCD functions as both the display unit 204 and the input unit 205. The arrangement is not limited to this. The input unit 205 (for example, a keyboard) may be arranged independently of the display as the display unit 204.

A GPS sensor 206 detects the current position of the vehicle. A vehicle speed sensor 207 detects the current speed of the vehicle. A gyro sensor 208 detects the rotation motion of the vehicle. The CPU 201 determines the course of the vehicle based on the detection results of these sensors. In addition, in this embodiment, since the electric vehicle is used as a vehicle on which the user rides, the in-vehicle device 101 includes a battery remaining amount sensor 209 for detecting the remaining amount of the battery of the electric vehicle. The CPU 201 estimates (calculates) a possible traveling distance of the vehicle based on the battery remaining amount detected by the battery remaining amount sensor 209.

Figure 2B:
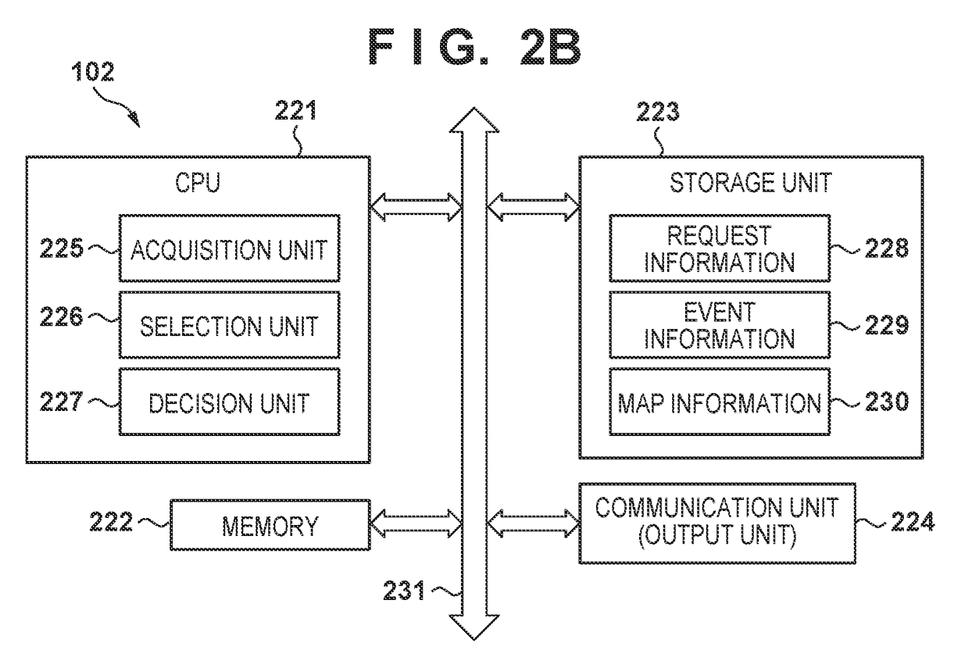
FIG. 2B is a block diagram showing the arrangement of a server.

FIG. 2B is a block diagram showing the arrangement of the server 102. The respective blocks shown in FIG. 2B are communicably connected via a system bus 231. A CPU 221 comprehensively controls the server 102 by causing the CPU 221 to read out, for example, a program stored in a storage unit 223 to a memory 222 and execute the program. In addition, a communication unit 224 serves as an interface capable of performing communication with the network 104 and can exchange information with the in-vehicle device 101 and each facility 103 via the network 104. The storage unit 223 can store, for example, user request information 228 received from the in-vehicle device 101, event information 229 in each facility, received from each facility 103, map information 230 received by the communication unit 224 via the network 104, and the like in addition to the basic programs and data for operating the server 102.

The request information 228 is information indicating the user request when the user goes around to visit a plurality of transit points. The request information 228 is input by the user via the input unit 205 of the in-vehicle device 101 and received by the communication unit 224 via the network 104. The request information 228 can include, for example, time information indicating a time during which the user can spend the stay of a transit point (for example, a time during which the user spends sightseeing), destination information indicating the destination (the final destination) at which the user finally reaches and the arrival target time to the destination, and the like in addition to information indicating a desired sightseeing spot or a desired event in the sightseeing spot when the user goes sightseeing of the sightseeing spots as the plurality of transit points.

The event information 229 is information indicating the schedule of an event conducted in each facility 103 and is received from the computer of each facility 103 to the communication unit 224 via the network 104. The event information 229 may include predicted congestion information indicating the congestion degree in each facility 103, information concerning a scene shooting timing such as the location and time capable of shooting a photo in which the sunset is included in the scene in each facility 103, information indicating whether charging of the electric vehicle is possible (that is, information indicating whether the charging station is present), and the like in addition to information indicating the type of event performed in each facility and its scheduled times (for example, the date and time, the start time, the end time, and the execution time).

The map information 230 is information indicating the positions and roads of the plurality of facilities 103 and can be received by the communication unit 224 via the network 104. The map information 230 may include traffic jam information predicted from a past tendency in consideration of the day of the week, the season, and the weather, traffic information such as a construction and a road closure, and the like.

The CPU 221 of the server 102 can include an acquisition unit 225, a selection unit 226, and a decision unit 227. The acquisition unit 225 acquires the request information 228 and the event information 229 stored in the storage unit 223. The selection unit 226 obtains a matching degree between the request information 228 of the user and the event information 229 of each facility 103 among the plurality of facilities 103 serving as the candidates of the transit points and selects possible transit points (the facility 103) in accordance with the obtained matching degree. In addition, the decision unit 227 decides a go-around route in which the user can go around to visit the transit point selected by the selection unit 226. The communication unit 224 (output unit) transmits (outputs) the decided go-around route data to the in-vehicle device 101 via the network 104.

Figure 3:
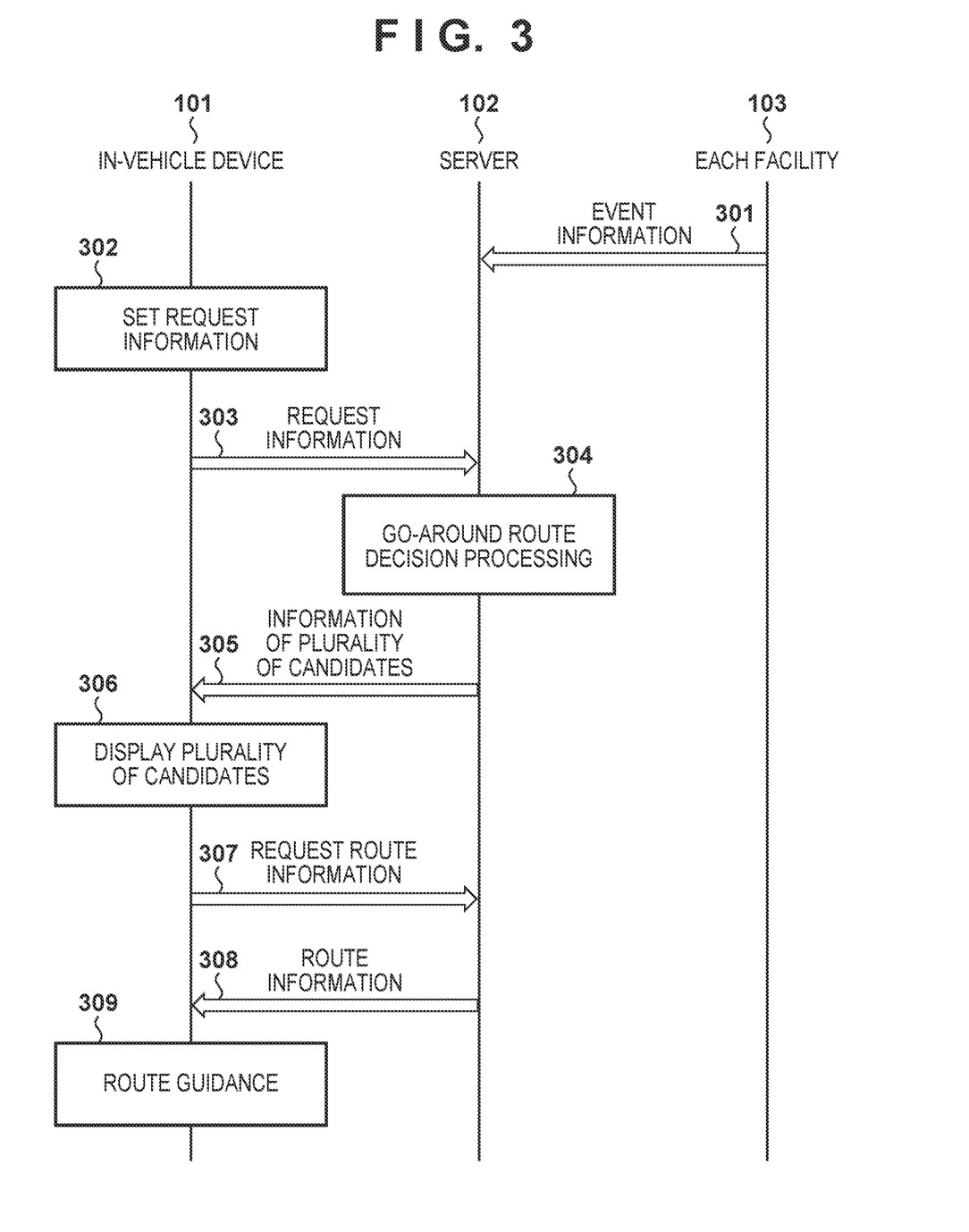
FIG. 3 is a sequence chart showing processing performed between the in-vehicle device, the server, and the respective facilities.

Next, processing performed between the in-vehicle device 101, the server 102, and each facility 103 in the route guidance system 100 shown in FIG. 1 will be described with reference to FIG. 3. FIG. 3 is a sequence chart showing processing between the in-vehicle device 101, the server 102, and each facility 103. In step 301, the computer arranged in each facility 103 or the like transmits event information to the server 102 via the network 104. In step 302, the user sets the request information in the in-vehicle device 101. In step 303, the request information set by the user is transmitted from the in-vehicle device 101 to the server 102 via the network 104.

Upon transmitting the request information, the server 102 performs processing for deciding the go-around route of the plurality of facilities 103 serving as the transit points (step 304). Details of the go-around route decision processing will be described later. If the plurality of go-around route candidates are decided in the server 102, the information of the plurality of candidates is transmitted from the server 102 to the in-vehicle device 101 (step 305), and the information of the plurality of transmitted candidates is displayed on the display unit 204 of the in-vehicle device 101 (step 306). The in-vehicle device 101 requests, to the server 102, go-around route information (for example, route guidance information) about one candidate selected, from the plurality of candidates displayed on the display unit 204, by the user via the input unit 205 (step 307), The server 102 transmits the go-around route information requested from the in-vehicle device 101 to the in-vehicle device 101 via the network 104 (step 308). Accordingly, the in-vehicle device 101 starts providing the route guidance to the user in accordance with the go-around route information acquired from the server 102 (step 309).

Figure 4:
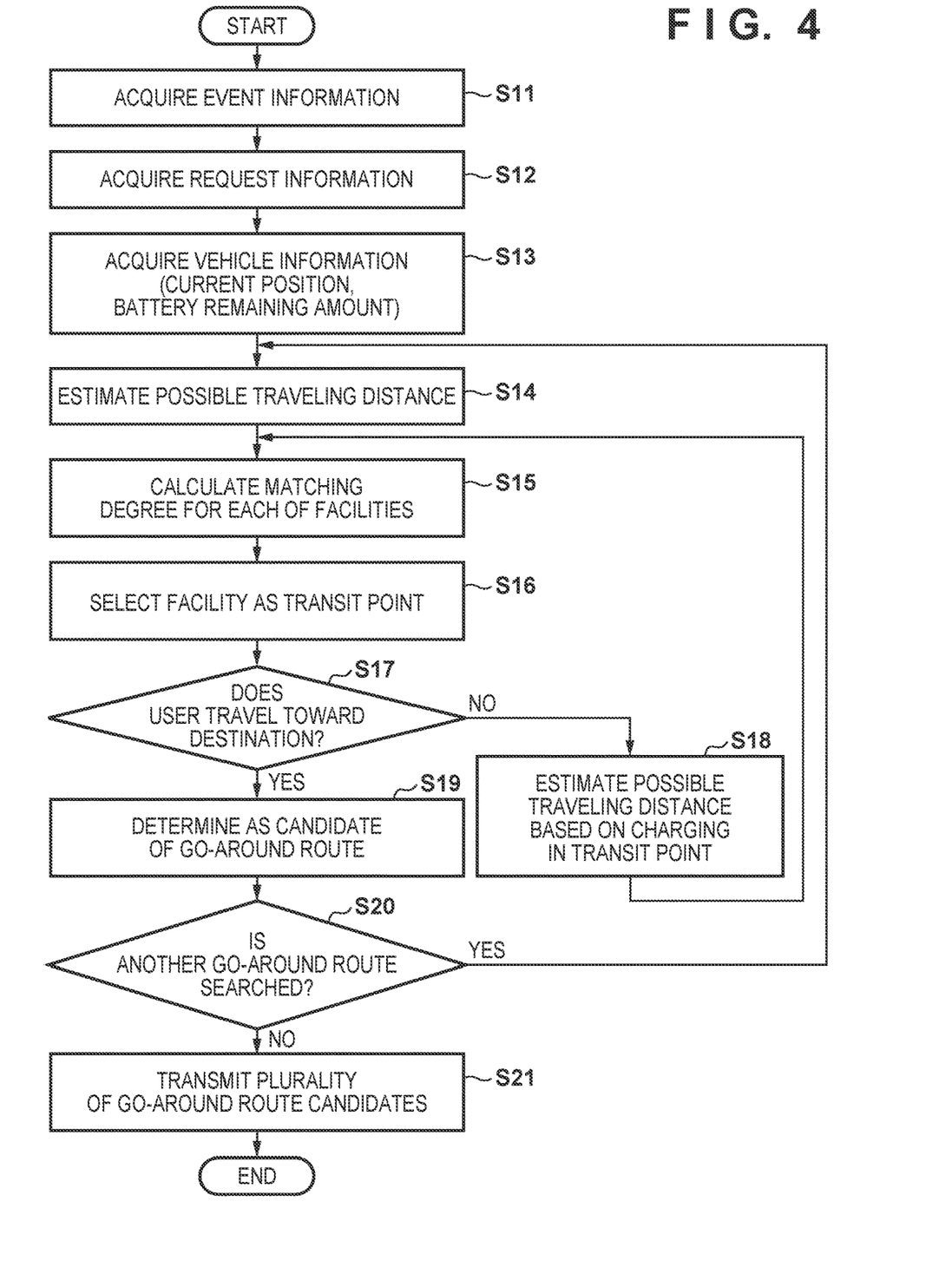
FIG. 4 is a flowchart showing processing for deciding a go-around route of a plurality of transit points.

Processing for deciding the go-around route of the plurality of transit points (facilities 103), which is performed in step 304 of FIG. 3, will be described with reference to FIG. 4. FIG. 4 is a flowchart showing processing for deciding the go-around route of the plurality of transit points. In the following description, an example in which the processing in FIG. 4 is executed by the CPU 221 of the server 102 will be described below. However, the CPU 201 of the in-vehicle device 101 may have the function of the CPU 221 of the server 102, and this processing may be executed by the CPU 201 of the in-vehicle device 101.

In S11, the CPU 221 receives and acquires the event information 229 stored in the storage unit 223 from each facility 103 via the network 104 by the communication unit 224. As described above, the event information 229 can include, for example, the type of event conducted in each facility 103 and its schedule, information indicating the congestion degree in each facility 103, information concerning the shooting timing, and the like.

Figure 5:
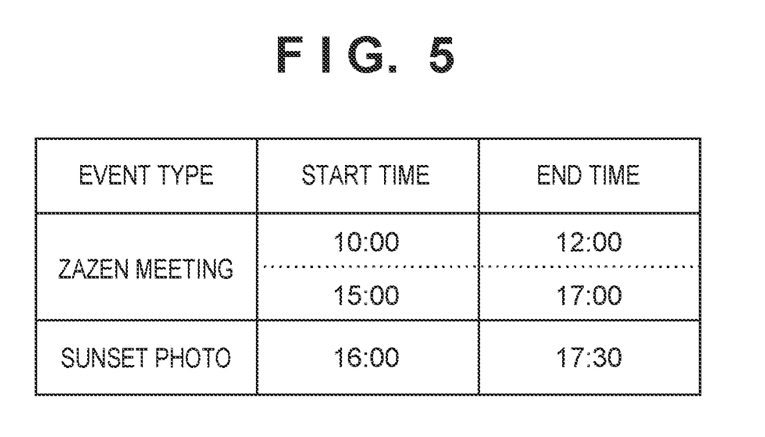
FIG. 5 is a table showing an example of information indicating the types of events and their scheduled times.
Figure 6:
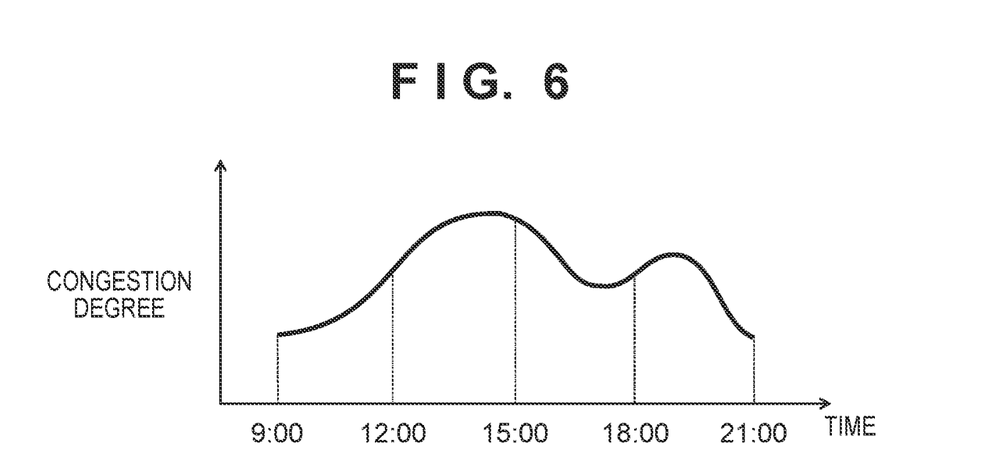
FIG. 6 is a graph showing an example of predicted congestion information.

FIG. 5 is a view showing, as the event information 229, an example of information indicating the type of event conducted in a predetermined facility 103 of the plurality of facilities 103 and its scheduled time. The information shown in FIG. 5 indicates a "zazen meeting" and a "timing of shooting a sunset photo" as the types of events. As for the "zazen meeting", a zazen meeting starting at 10:00 and ending at 12:00 and a zazen meeting starting at 15:00 and ending at 17:00 are shown. As for the "shooting timing", FIG. 5 shows that a sunset photo can be taken in a scene in the predetermined facility 103 during a time zone from 16:00 to 17:30. FIG. 6 is a view showing an example of predicted congestion information indicating a congestion degree in the predetermined facility 103 as the event information 229. Assuming that the abscissa represents the time from opening (9:00) to closing (21:00) and the ordinate represents the congestion degree, the predicated congestion information shown in FIG. 6 can be predicted from the past tendency in consideration of the day of the week, the season, and the weather.

In S12, the CPU 221 receives and acquires the user request information 228 stored in the storage unit 223 from the in-vehicle device 101 via the network 104 by the communication unit 224. As described above, the request information 228 can include, for example, destination information indicating a destination and its arrival target time, information such as an event indicating a facility where the user wants to visit until the user reaches the destination, and the like.

Figure 7:
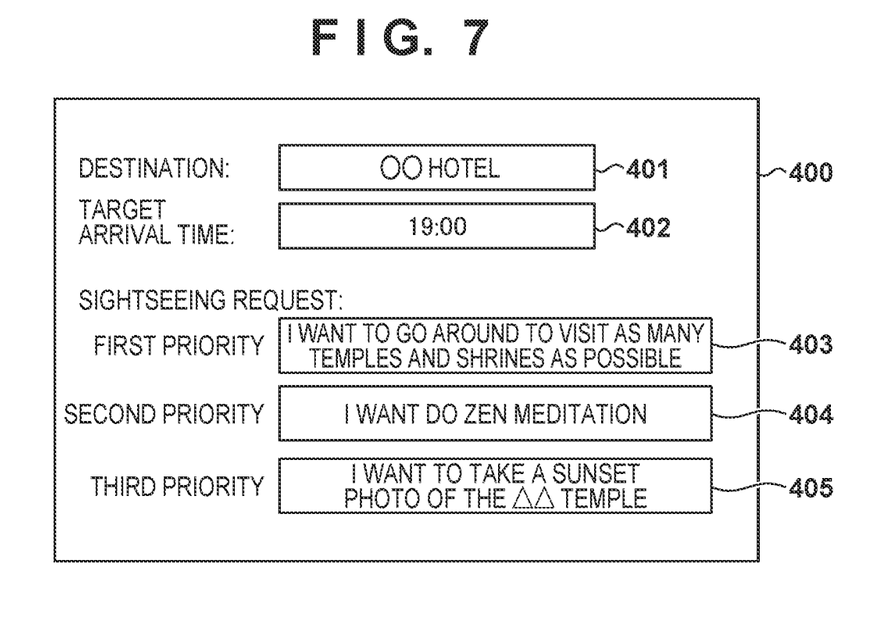
FIG. 7 is a view showing a screen for inputting request information.

FIG. 7 is a view showing an example of a screen 400 displayed on the touch panel display serving as the input unit 205 of the in-vehicle device 101. The screen 400 shown in FIG. 7 includes an input field 401 for inputting the final destination of the user and an input field 402 for inputting the arrival target time for the final destination. In addition, the screen 400 includes input fields 403 to 405 for inputting, in a priority order, sightseeing requests events of facilities for which the user wants to visit. In the example shown in FIG. 7, the first priority to the third priority can be input in accordance with the sightseeing requests. However, the number of input columns for inputting the sightseeing requests or the like can be arbitrarily set. Items may be directly input in the input fields 401 to 405 by the user or may be input using a pull-down method.

In S13, the CPU 221 acquires (receives) user vehicle information (to be also referred to as vehicle information hereinafter) from the in-vehicle device 101 via the network 104 by the communication unit 224. The user vehicle information can include, for example, information (current position information) indicating the current position of the vehicle of the user calculated from the detection results of the GPS sensor 206, the vehicle speed sensor 207, and the gyro sensor 208 of the in-vehicle device 101 and information (battery remaining amount information) indicating the remaining amount of the battery detected by the battery remaining amount sensor 209 of the in-vehicle device 101. In addition, the user vehicle information may include information concerning the characteristics (performance) of the vehicle of the user, such as the capacity and charging rate of the battery and the fuel consumption (traveling distance per unit power).

In S14, the CPU 221 estimates (calculates) a possible traveling distance which allows the vehicle to travel with the battery remaining amount, based on the battery remaining amount information acquired from the in-vehicle device 101 and the user vehicle information. In this embodiment, although the CPU 221 estimates the possible traveling distance based on the battery remaining amount information, the present invention is not limited to this. The CPU 201 of the in-vehicle device 101 may acquire, in place of the battery remaining amount information, information of a possible traveling distance estimated (calculated) from the battery remaining amount information.

In S15, the CPU 221 calculates (decides) a matching degree between the user request information 228 and the event information 229 for each of the plurality of facilities 103 included in the range of the possible traveling distance estimated in S14. For example, the CPU 221 obtains an index value (a point value) indicating the matching degree between the user request information 228 and the event information 229 for each facility 103 within the range of the possible traveling distance.

More specifically, as for a user request "I want to go around to visit temples and shrines as much as possible" input to the input field 403 of the screen 400 shown in FIG. 7, a larger index value is given to the facility 103 closer to the current position of the user in accordance with a distance between the current position of the user and each facility 103. As for a user request "I want to sit in Zen meditation" input to the input field 404, an index value is given to the facility 103 where an event satisfying the request is conducted. In addition, as for a user request "I want to take a sunset photo of the ΔΔ temple" input to the input field 405, a time during which the sunset photo can be taken is limited to a given time zone, and the index value is given to the facility 103 of the ΔΔ temple. That is, the index value of the facility 103 of the ΔΔ temple in the given time zone is increased. The index values are cumulatively given to each facility 103 for each user request, and a larger index value is given to a higher priority of the user request. For the facility 103 having a larger given index value, the matching degree with the user request of the facility 103 is higher.

In S16, the CPU 221 preferentially selects the facility 103 having a high matching degree calculated in S15, as the transit point where the user can go around to visit within the range of the possible traveling distance with the battery remaining amount. At this time, the CPU 221 may preferentially select as the transit point, the specific facility 103 having a charging station Where the battery of the user vehicle can charge. Alternatively, the CPU 221 may select the transit point in consideration of the stay time in the facility 103. The stay time in the facility 103 is, for example, a general time estimated to be needed to stay (for example, sightseeing) in the facility 103 based on the past tendency. The CPU 221 can determine whether the user can reach the destination until the arrival target time and select a transit point when the user has stayed in the facility 103 by only the stay time and has left the facility 103.

Figure 8A:
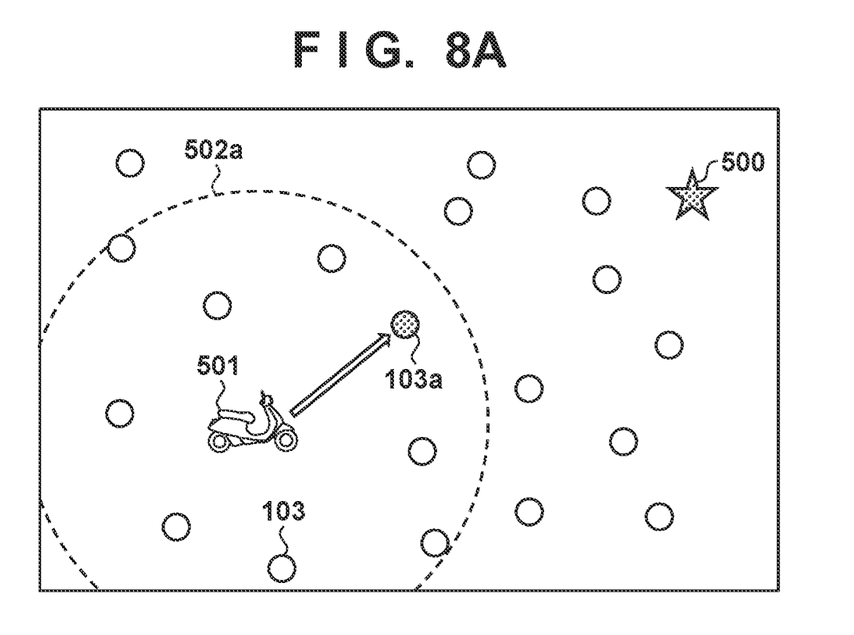
FIG. 8A is a conceptual view of a method of selecting a facility as a transit point.

FIG. 8A is a conceptual view of a method of selecting a facility 103*a* as the first transit point from the current position of a user vehicle 501. As shown in FIG. 8A, based on the possible traveling distance estimated in S14, the CPU 221 sets a range 502*a* in which the user vehicle 501 can travel from the current position and selects, as a transit point, the facility 103*a* having the highest matching degree calculated in S15, among the plurality of facilities 103 included in the range 502*a*. Next, the CPU 221 also calculates the scheduled departure time from the facility 103*a* in consideration of the route until the facility 103*a* selected as the transit point, the target arrival time to the facility 103*a*, the stay time in the facility 103*a*, and the like. In addition, if the facility 103*a* selected as the transit point is the specific facility 103 including a charging station, the CPU 221 also estimates (calculates) the battery remaining amount when assuming that the battery of the user vehicle 501 is charged within the stay time in the facility 103*a*.

In S17, the CPU 221 determines in accordance with a time difference between the scheduled departure time calculated in S16 and the target arrival time to a destination 500 whether the user travels toward the destination 500. For example, the CPU 221 determines based on the time difference between the scheduled departure time calculated in S16 and the schedule arrival time to the destination 500 whether the user can go around to visit another facility 103. If there is an enough time margin until the target arrival time and the CPU 221 determines that the user can go around to visit the other facility 103, the process advances to S18 to perform processing for selecting a next facility 103 that the user goes around to visit. In S18, the CPU 221 estimates (calculates) a possible traveling distance with a battery remaining amount based on the battery remaining amount estimated when the battery is charged in the facility 103 selected in S16. After the possible traveling distance is estimated in S18, the processes in S15 to S17 described above are repeatedly performed.

Figure 8B:
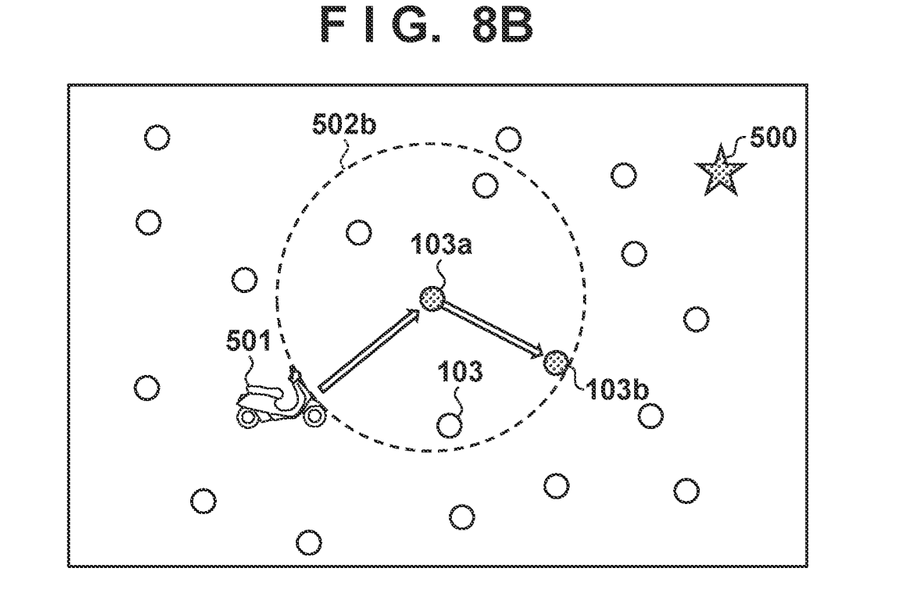
FIG. 8B is a conceptual view of a method of selecting facilities as transit points.

FIG. 8B is a conceptual view of a method of selecting a facility 103*b* as the second transit point. As shown in FIG. 8B, based on the possible traveling distance estimated in S18, the CPU 221 sets a range 502*b* in which the user vehicle 501 can travel from a facility 103*a* as the first transit point and selects, as a transit point, the facility 103*b* having the high matching degree calculated in S15, among the plurality of facilities 103 included in the range 502*b*. The CPU 221 also calculates the scheduled departure time from the facility 103*b* and the like in consideration of the route from the facility 103*a* as the first transit point to the facility 103*b* as the second transit point, the target arrival time to the facility 103*b*, and the stay time in the facility 103*b*. In addition, the CPU 221 also estimates (calculates) the battery remaining amount assuming that the battery of the user vehicle 501 is charged within the stay time in the facility 103*b*.

Figure 8C:
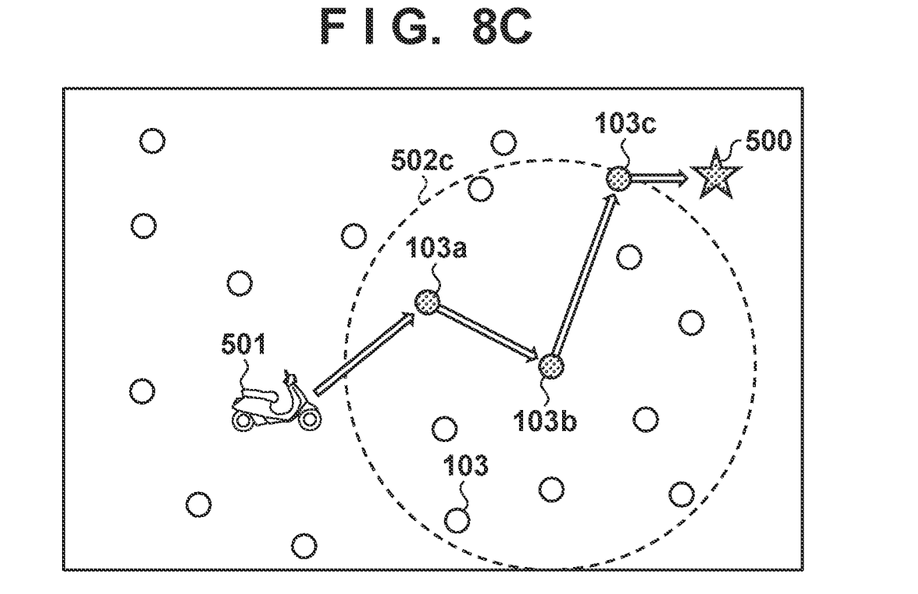
FIG. 8C is a conceptual view of a method of selecting facilities as transit points.

FIG. 8C is a conceptual view of a method of selecting a facility 103*c* as the third transit point. As shown in FIG. 8C, based on the possible traveling distance estimated in S18, the CPU 221 sets a range 502*c* in which the user vehicle 501 can travel from a facility 103*b* as the second transit point and selects, as a transit point, the facility 103*c* having the high matching degree calculated in S15, among the plurality of facilities 103 included in the range 502*c*. Next, the CPU 221 calculates the scheduled departure time from the facility 103*c* and the like in consideration of the route from the facility 103*b* as the second transit point to the facility 103*c* as the third transit point, the target arrival time to the facility 103*c*, and the stay time in the facility 103*c*. In addition, the CPU 221 also estimates (calculates) the battery remaining amount assuming that the battery of the user vehicle 501 is charged within the stay time in the facility 103*c*.

In the examples shown in FIGS. 8A to 8C, after the facility 103*c* is selected as the third transit point, the CPU 221 determines in S17 that the time difference between the scheduled departure time from the facility 103*c* and the target arrival time from the facility 103 to the destination 500 is short, and the user vehicle 501 cannot go around to visit another facility 103. That is, in S17, the CPU 221 determines that the user vehicle 501 goes to the destination 500 after it stays in the facility 103*c* as the third transit point. The process then advances to S19.

In S19, the CPU 221 determines, as one candidate, a go-around route of a plurality of transit points obtained by the processes in S14 to S18. In S20, the CPU 221 determines whether another go-around route candidate is decided (searched). For example, the CPU 221 determines in S15, based on whether a facility 103 remote from the transit point regardless of the facility 103 having a relatively high matching degree (the degree is equal to or higher than a predetermined value) is present, whether another candidate of the go-around route may be decided. In addition, based on whether the number of decided go-around route candidates reaches the preset target number of candidates, the CPU 221 determines whether another go-around route candidate is decided. The target number of candidates may be, for example, preset by the user via the input unit 205 of the in-vehicle device 101 or set in advance in the server 102. If the CPU 221 determines that another go-around route candidate is decided, processes in S14 to S18 are performed again. In this case, the CPU 221 can newly decide second and subsequent candidates in consideration of the candidates so a route is not the same as the already decided candidate.

In S21, the CPU 221 transmits (outputs) information of a plurality of go-around route candidates decided so far to the in-vehicle device 101 via the network 104 by the communication unit 224. In the in-vehicle device 101, the information of the plurality of go-around route candidates received via the network 104 by the communication unit 210 is displayed on the touch panel display serving as the display unit 204.

Figure 9:
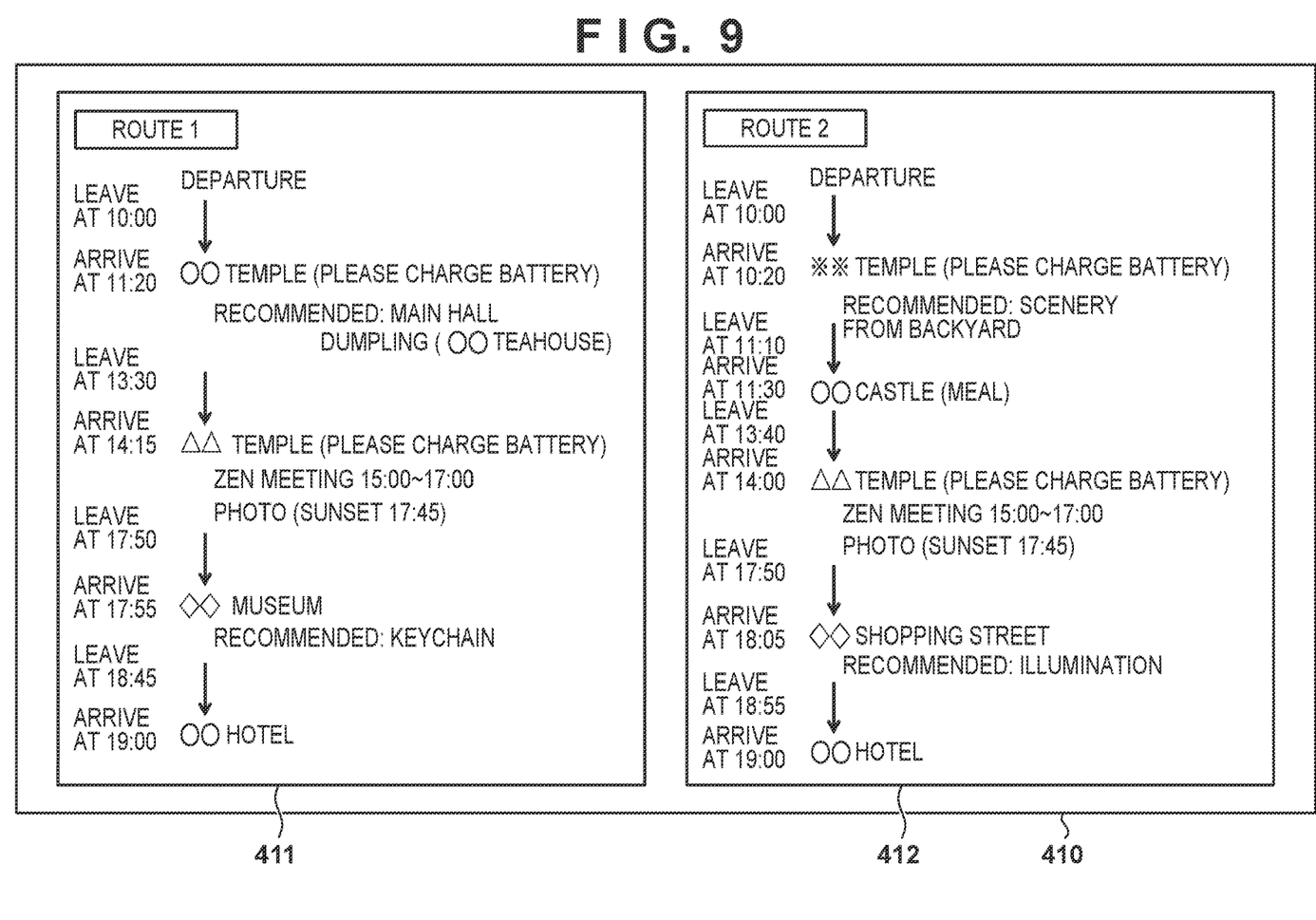
FIG. 9 is a view showing an example of a screen showing information of a plurality of candidates of a go-around route.

FIG. 9 is a view showing an example of a screen 410 showing the information of the plurality of go-around route candidates. The screen 410 can be displayed on the touch panel display serving as the display unit 204 of the in-vehicle device 101. In the example of FIG. 9, two go-around route candidates 411 and 412 are displayed. The number of go-around route candidates is not limited to two, but can be three or more. If the user touches to select one of the plurality of go-around route candidates displayed on the touch panel display, the request instruction of the information of the go-around route of the selected candidate is transmitted to the server 102 via the network 104. The information (route information) of the go-around route of the selected candidate is transmitted from the server 102 to the in-vehicle device 101 via the network 104. In the in-vehicle device 101, the CPU 201 starts route guidance based on the transmitted information of the go-around route.

As has been described above, according to this embodiment, the matching degree between the user request information and the event information in each facility 103 is calculated, the plurality of facilities 103 where the user goes around to visit the facilities as the transit points are selected in accordance with the calculated matching degree of each facility 103, and the go-around route of these facilities is decided. Accordingly, the user can efficiently go around to visit the plurality of facilities to cope with the user request.

Summary of Embodiment

A route guidance apparatus of the above embodiment is a route guidance apparatus for guiding a go-around route of a plurality of transit points, comprising acquisition means (for example, 225) for acquiring request information of a user and event information for each of candidates of the plurality of transit points, selection means (for example, 226) for selecting possible round transit points among the candidates of the plurality of transit points in accordance with a matching degree between the request information and the event information, and decision means (for example, 227) for deciding a go-around route of the transit point selected by the selection means. With this arrangement, the route in which the user can efficiently go around to visit the plurality of facilities to cope with the user request can be provided to the user.

In addition, the request information includes time information indicating a time during which the user can spend stay in a transit point, and the selection means selects the possible round transit points further in accordance with the time information. With this arrangement, the route where the user can efficiently go around to visit the plurality of facilities within the time requested by the user can be provided.

In addition, the request information includes destination information indicating a destination and target arrival time to the destination, and the selection means selects the possible round transit points further in accordance with the destination information. With this arrangement, the route where the user can reach the user destination at the arrival target time can be provided.

In addition, the selection means selects the possible round transit points in consideration of a stay time in each transit point. With this arrangement, the stay in each transit point such as a sightseeing transit point can satisfy the user request.

In addition, the event information includes at least one of information concerning a type, start time, and end time of an event, information concerning a shooting timing, and predicted congestion information. With this arrangement, the route further coping with the user request can be provided.

In addition, the selection means selects the possible round transit points in accordance with a possible traveling distance with a remaining amount of a battery mounted in an electric vehicle of the user. With this arrangement, the go-around route can be decided so as not to cause the dead battery during traveling.

In addition, the selection means selects a specific transit point with a charging station as the possible round transit points within the range of the possible traveling distance. With this arrangement, since the battery can be charged in each transit point, the possibility of the dead battery during traveling can be reduced.

In addition, the selection means decides a transit point where the user goes around to visit next in accordance with the possible traveling distance estimated if the battery is charged during a stay time in the specific transit point. With this arrangement, the go-around route can be decided without the dead battery during traveling.

In addition, the decision means decides a plurality of candidates for the go-around route. With this arrangement, the degree of selection of the go-around route to cope with the user request can be increased.

The present invention is not limited to the above-described embodiments, and various changes and modifications can be made within the spirit and scope of the present invention. Therefore, to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A route guidance apparatus which is mounted in a vehicle and guides a route for visiting a plurality of facilities by the vehicle, the apparatus comprising:
the vehicle having a battery and a battery remaining amount sensor that detects a remaining amount of battery of the vehicle;
an input device configured to accept information input from a user;
a communication device configured to communicate with a network,
at least one processor with a memory comprising instructions, that when executed by the at least one processor, cause the at least one processor to at least:
acquire, from a user by the input device, request information indicating a plurality of requests of the user regarding the route;
acquire, from each of a plurality of facility candidates by the communication device, event information including a schedule of an event to be performed in each of the facility candidates and a prediction of congestion degree in each of the facility candidates;
select facilities that can be visited, among the facility candidates, in accordance with a matching degree between the request information and the event information; and
decide the route so as to visit the selected facilities,
wherein the request information includes a priority set by the user for each of the plurality of requests, and
wherein the at least one processor is configured to:
for each respective one of the facility candidates, calculating an index value indicating a degree of matching between each respective one of the facility candidates and individual ones of the requests, wherein a cumulative matching degree is calculated for a respective one of the facility candidates from the index values associated with the respective one of the facility candidates such that the cumulative matching degree is higher as priority of a request which matches the event information among the plurality of requests is higher, and preferentially select, as the facilities that can be visited, facilities whose the calculated matching degree is higher, and estimate, in a case where the selected facilities include a specific facility with a charging station, a possible traveling distance of the vehicle by assuming that a battery of the vehicle is to be charged during a stay time at the specific facility, given a possible traveling distance of the vehicle based on the battery remaining amount detected by the battery remaining amount sensor, and decide the route based on the estimated possible traveling distance.

2. The route guidance apparatus according to claim 1, wherein
the request information includes time information indicating a time period during which the user can stay in a facility, and
the at least one processor is configured to select the facilities that can be visited, further in accordance with the time information.

3. The route guidance apparatus according to claim 1, wherein
the request information includes destination information indicating a destination and target arrival time to the destination, and
the at least one processor is configured to select the facilities that can be visited, further in accordance with the destination information.

4. The route guidance apparatus according to claim 1, wherein the at least one processor is configured to select the facilities that can be visited, in consideration of a stay time in each facility.

5. The route guidance apparatus according to claim 1, wherein the event information includes at least one of information concerning a type, start time, and end time of an event, information concerning a shooting timing, and predicted congestion information.

6. The route guidance apparatus according to claim 1, wherein the at least one processor is configured to select the facilities that can be visited, in accordance with a possible traveling distance with a remaining amount of the battery of the vehicle.

7. The route guidance apparatus according to claim 6, wherein the at least one processor is configured to select the specific facility with the charging station as one of the facilities that can be visited, within the range of the possible traveling distance.

8. The route guidance apparatus according to claim 7, wherein the at least one processor is configured to select a facility where the user goes around to visit next in accordance with the possible traveling distance estimated if the battery is charged during a stay time in the specific facility.

9. The route guidance apparatus according to claim 1, wherein the at least one processor is configured to decide the facility candidates.

10. The route guidance apparatus according to claim 1, wherein the at least one processor is configured to preferentially select, as the facilities that can be visited, a facility with a charging station among the facility candidates.

11. The route guidance apparatus according to claim 1, wherein the at least one processor is configured to decide a plurality of route candidates for the route.

12. The route guidance apparatus according to claim 11, wherein the at least one processor is configured to:
decide a first route candidate for the route, and
decide, in a case where the facility candidates include a facility candidate which is deviated from the first route candidate even though the cumulative matching degree is equal to or more than a threshold, a second route candidate so as to include the deviated facility candidate.

13. A route guidance method of guiding a route for visiting a plurality of facilities, by at least one processor mounted in a vehicle, the method comprising:
providing a battery and a battery remaining amount sensor in the vehicle, the battery remaining amount sensor being configured to detect a remaining amount of battery of the vehicle;
acquiring, from a user, request information indicating a plurality of requests of the user regarding the route;
acquiring, from each of a plurality of facility candidates, event information including a schedule of an event to be performed in each of the facility candidates and a prediction of congestion degree in each of the facility candidates;
selecting facilities that can be visited, among the facility candidates, in accordance with a matching degree between the request information and the event information; and
deciding the route so as to visit the selected facilities,
wherein the request information includes a plurality of requests each having priority set by the user for each of the plurality of requests,
wherein in the selecting, an index value is calculated for each respective one of the facility candidates indicating a degree of matching between each respective one of the facility candidates and individual ones of the requests, wherein a cumulative matching degree is calculated for a respective one of the facility candidates from the index values associated with the respective one of the facility candidates such that the cumulative matching degree is higher as priority of a request which matches the event information among the plurality of requests is higher, and facilities for which the cumulative matching degree is higher is preferentially selected as the facilities that can be visited, and
wherein in the deciding, in a case where the selected facilities include a specific facility with a charging station, a possible traveling distance of the vehicle is estimated by assuming that a battery of the vehicle is to be charged during a stay time at the specific facility, given a current possible traveling distance of the vehicle based on the battery remaining amount detected by the battery remaining amount sensor, and the route is decided based on the estimated possible traveling distance.

14. A non-transitory computer-readable storage medium storing a program for causing a computer to perform a route guidance method according to claim 13.

* * * * *